US012644483B2

(12) United States Patent
Branch et al.

(10) Patent No.: US 12,644,483 B2
(45) Date of Patent: Jun. 2, 2026

(54) MULTI-PIECE FASTENER COMPRISING A TAPERED THREADED PORTION AND METHOD OF FASTENING

(71) Applicant: Howmet Aerospace Inc., Pittsburgh, PA (US)

(72) Inventors: Justin S. Branch, Waco, TX (US); Robert B. Wilcox, McGregor, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 493 days.

(21) Appl. No.: 17/907,350

(22) PCT Filed: May 26, 2021

(86) PCT No.: PCT/US2021/034206
§ 371 (c)(1),
(2) Date: Sep. 26, 2022

(87) PCT Pub. No.: WO2021/242828
PCT Pub. Date: Dec. 2, 2021

(65) Prior Publication Data
US 2023/0112581 A1     Apr. 13, 2023

Related U.S. Application Data

(60) Provisional application No. 63/030,504, filed on May 27, 2020.

(51) Int. Cl.
F16B 35/04 (2006.01)
F16B 33/02 (2006.01)
F16B 37/04 (2006.01)

(52) U.S. Cl.
CPC ............ F16B 35/041 (2013.01); F16B 33/02 (2013.01); F16B 37/041 (2013.01)

(58) Field of Classification Search
CPC ...... F16B 35/041; F16B 33/02; F16B 37/041; F16B 35/045; F16B 37/065; F16B 5/02;
(Continued)

(56) References Cited

U.S. PATENT DOCUMENTS 2,167,559 A * 7/1939 Upson ................. F16B 25/0021
411/415
2,542,376 A 2/1951 Torresen
(Continued)

FOREIGN PATENT DOCUMENTS

CN 105765241 A 10/2018
CN 110145525 A 8/2019
(Continued)

OTHER PUBLICATIONS

International Search Report and Written Opinion of the International Searching Authority for International Application No. PCT/US2021/034206 mailed Sep. 16, 2021.

*Primary Examiner* — Kristina R Fulton
*Assistant Examiner* — Jock Wong
(74) *Attorney, Agent, or Firm* — K&L Gates LLP

(57) ABSTRACT

A fastener comprising a pin and a collar. The pin comprising a shank comprising a tapered lock groove thread profile; and a head portion configured to receive a torque. The collar configured to be deformed onto and secured to the shank, wherein the collar comprises an external surface configured to receive a torque such that the collar can be removed from the shank after deformation.

20 Claims, 7 Drawing Sheets

(58) Field of Classification Search
CPC ........ F16B 33/008; F16B 35/00; F16B 35/04;
F16B 37/00; F16B 37/04; F16B 41/002;
F16B 19/05; F16B 39/026; F16B 39/025
USPC .... 411/360, 337, 366.1, 383, 427, 436, 361,
411/277, 278, 279, 426
See application file for complete search history.

(56) References Cited

U.S. PATENT DOCUMENTS

| | | | | |
|---|---|---|---|---|
| 3,492,906 | A | * | 2/1970 | Hauser .................... F16B 33/02 411/389 |
| 3,921,364 | A | * | 11/1975 | Briles ........................ F16B 5/02 411/378 |
| 4,254,809 | A | * | 3/1981 | Schuster ................. F16B 19/05 411/277 |
| 4,957,401 | A | * | 9/1990 | Hatter ................... F16B 31/021 411/436 |
| 5,039,265 | A | * | 8/1991 | Rath ........................ F16B 37/00 411/366.3 |
| 5,314,281 | A | * | 5/1994 | Turlach ................... F16B 19/05 411/361 |
| 5,315,755 | A | | 5/1994 | Fulbright et al. |
| 5,562,379 | A | * | 10/1996 | Rausch ................... F16B 19/05 411/361 |
| 5,579,986 | A | * | 12/1996 | Sherry .................. B23K 9/207 228/175 |
| 5,669,746 | A | * | 9/1997 | Myers ..................... F16B 19/05 411/366.3 |
| 6,019,559 | A | | 2/2000 | Myers et al. |
| 2003/0210969 | A1 | * | 11/2003 | Schultz ................... F16B 19/05 411/361 |
| 2004/0033122 | A1 | | 2/2004 | Hill |
| 2007/0009340 | A1 | * | 1/2007 | Van Cor ................ F16B 35/06 411/426 |
| 2015/0260217 | A1 | | 9/2015 | Woods et al. |
| 2019/0003506 | A1 | | 1/2019 | Yan |

FOREIGN PATENT DOCUMENTS

| | | | |
|---|---|---|---|
| EP | 0663535 | A1 * | 7/1995 |
| EP | 2261517 | A1 | 12/2010 |

* cited by examiner

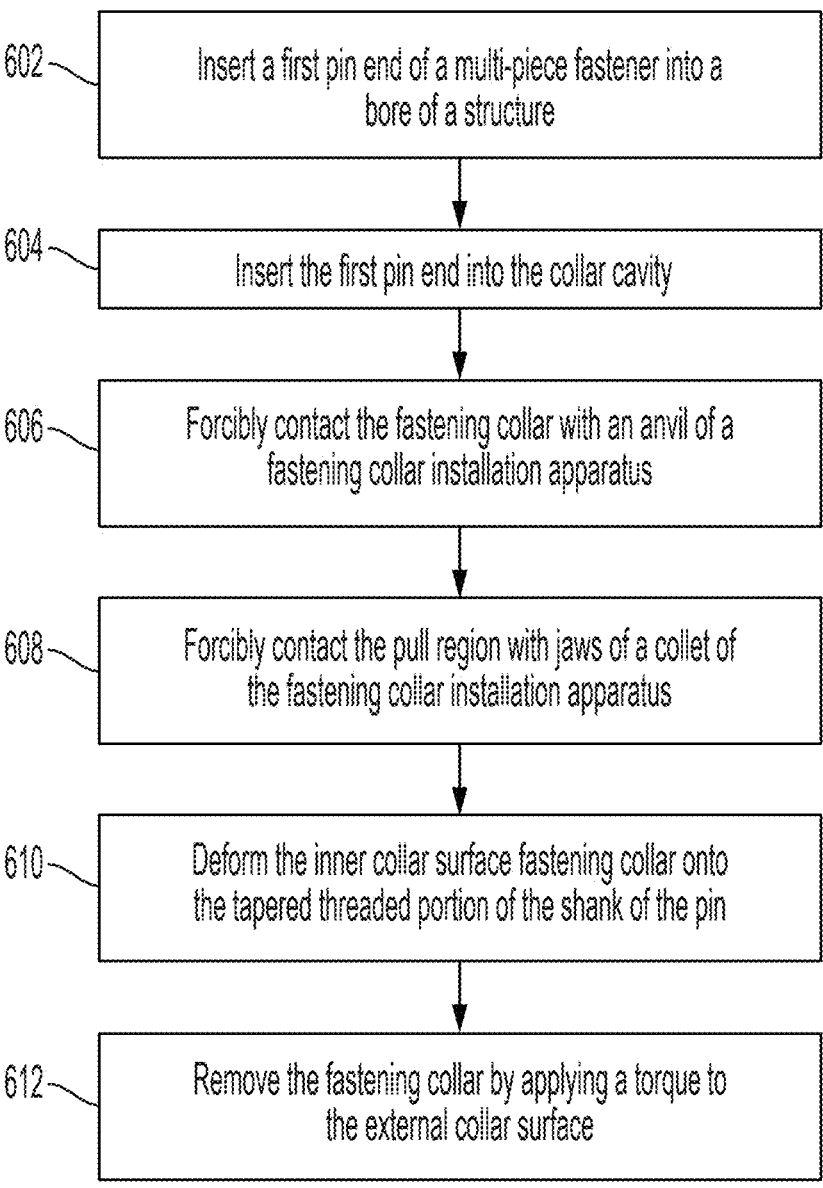

602 — Insert a first pin end of a multi-piece fastener into a bore of a structure 604 — Insert the first pin end into the collar cavity 606 — Forcibly contact the fastening collar with an anvil of a fastening collar installation apparatus 608 — Forcibly contact the pull region with jaws of a collet of the fastening collar installation apparatus 610 — Deform the inner collar surface fastening collar onto the tapered threaded portion of the shank of the pin 612 — Remove the fastening collar by applying a torque to the external collar surface

FIG. 6

MULTI-PIECE FASTENER COMPRISING A TAPERED THREADED PORTION AND METHOD OF FASTENING

FIELD OF USE

The present disclosure relates to multi-piece fasteners and methods of fastening using a multi-piece fastener. More particularly, the present disclosure relates to a multi-piece fastener comprising a tapered threaded portion and a related installation method.

BACKGROUND

A conventional machine bolt incudes a conventional male, helically threaded region and can be used to assemble two unthreaded components with the use of a threaded nut. A conventional threaded engagement between a machine bolt and a nut may undesirably loosen, such as, for example, under transverse vibration conditions and pivoting applications where a repeated torsional load is experienced. Conventional threads may also be cross-threaded during assembly and/or may require controlled torqueing to achieve a desirable pre-load. Furthermore, conventional threads may have a significantly variable clamp load if torqued with conventional means due to friction related variability.

A conventional shoulder bolt includes a shank with an unthreaded section encompassing a larger diameter "stand-off" or spacer portion in addition to a threaded section. The stand-off faces the workpiece and is intended to provide free pivoting movement or control of an installed clamp on the assembled pieces. A shoulder bolt may include a conventional male helically threaded section and, therefore, may present some of the drawbacks discussed above.

A conventional lock bolt is a structural two-piece fastener that utilizes a pin and a fastening collar. A permanent joint is created between the pin and the fastening collar when the fastening collar is swaged onto the pin. The fastening collar can deform onto annular rings of the pin and can be back extruded during installation, resulting in a desirable clamp load or pre-load. However, a lock bolt may be difficult to disassemble so that the underlying structure into which the lock bolt is installed can be serviced or modified. A conventional shoulder lock bolt may experience issues similar to those of a conventional lock bolt.

Providing a fastener design that maintains a repeatable desired clamp load, resists cross-threading, is efficient to assemble, and can be efficiently disassembled presents challenges.

SUMMARY

One aspect according to the present disclosure is directed to a multi-piece fastener comprising a fastening collar and a pin. The fastening collar comprises a first collar end, a second collar end, an inner collar surface extending from the first collar end to the second collar end and defining a collar cavity, and an external collar surface configured to receive a torque. The pin comprises a first pin end, a second pin end, and a shank extending intermediate the first pin end and the second pin end. The shank comprises a tapered threaded portion. The pin is configured to be at least partially received in the collar cavity. The inner collar surface of the fastening collar is configured to be deformed onto the tapered threaded portion and secured to the shank. The fastening collar is configured to be removable from the shank of the pin after deformation by applying a torque to the external collar surface.

Another aspect according to the present disclosure is directed to a method for fastening using a multi-piece fastener. The multi-piece fastener comprises a fastening collar and a pin. The fastening collar comprises a first collar end, a second collar end, an inner collar surface extending from the first collar end to the second collar end and defining a collar cavity, and an external collar surface. The pin comprises a first pin end, a second pin end, and a shank extending intermediate the first pin end and the second pin end. The shank comprises a tapered threaded portion. The pin is configured to be at least partially received in the collar cavity. The method comprises inserting the first pin end of the pin of the multi-piece fastener into a bore in a structure. The method further comprises deforming the inner collar surface of the fastening collar onto the tapered threaded portion of the pin, thereby securing the fastening collar to the pin.

It will be understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples presented herein, and the manner of attaining them, will become more apparent, and the examples will be better understood, by reference to the following description taken in conjunction with the accompanying drawings, wherein:

FIG. 6 is a flow chart illustrating a non-limiting embodiment of a method for fastening according to the present disclosure.

Corresponding reference characters indicate corresponding parts throughout the several views. The exemplifications set out herein illustrate certain embodiments, in one form, and such exemplifications are not to be construed as limiting the scope of the appended claims in any manner.

DESCRIPTION

Figure 1A:
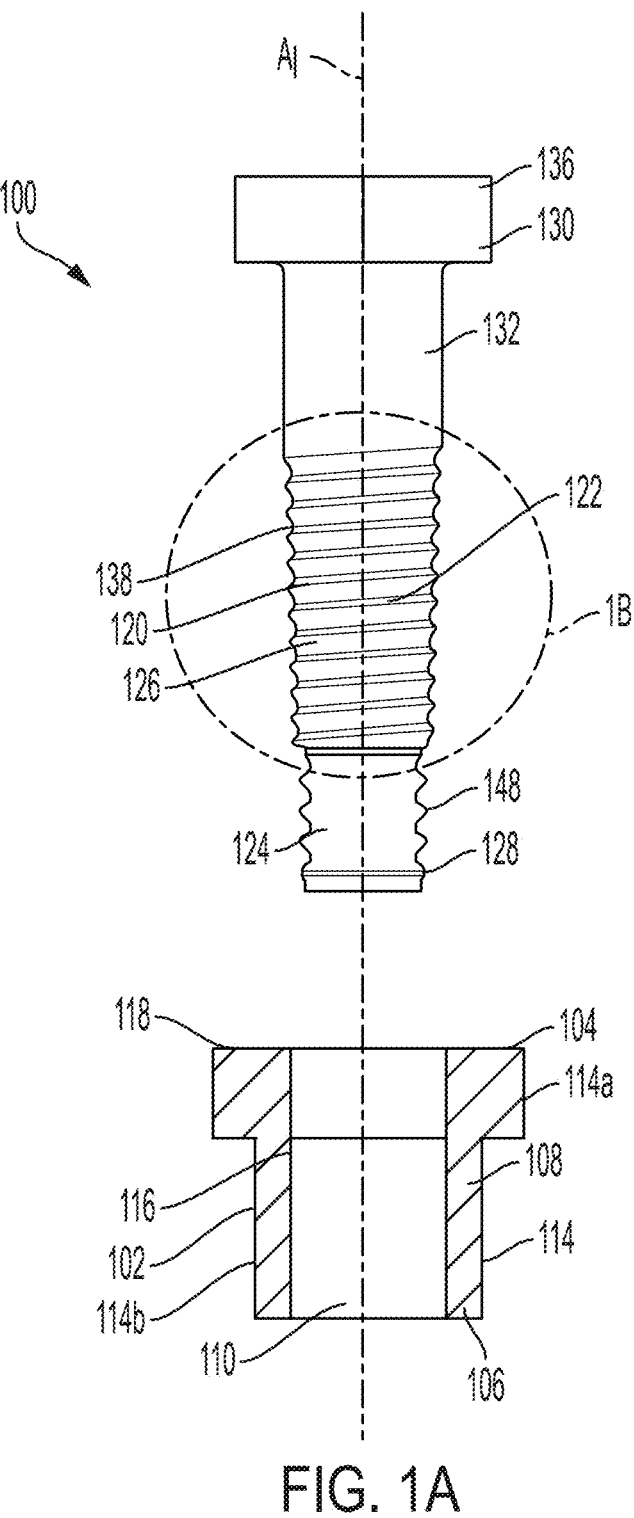
FIG. 1A is a partial cross-sectional side elevational view showing aspects of a non-limiting embodiment of a multi-piece fastener according to the present disclosure.

Various examples are described and illustrated herein to provide an overall understanding of the structure, function, and use of the disclosed multi-piece fasteners, fastening collars, pins, and methods of fastening. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments", "some embodiments", "one embodiment", "an embodiment", "non-limiting embodiment", or like phrases mean that a particular feature, structure, or characteristic described in connection with the example is included in at least one embodiment. Thus, appearances of the phrases "in various embodiments", "in some embodiments", "in one embodiment", "in an embodiment", "in a non-limiting embodiment", or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a", "an", and "the", as used herein, are intended to include "at least one" or "one or more", unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Providing a fastener design that maintains a repeatable desired clamp load, resists cross-threading, is efficient to assemble, and can be efficiently disassembled presents challenges. The present disclosure provides a multi-piece fastener that can be configured to achieve a repeatable desirable clamp load, resists cross-threading, and be easily installed and disassembled. Various embodiments of a multi-piece fastener according to the present disclosure allow the multi-piece fastener to be installed in a structure in an efficient manner and to be disassembled and uninstalled so as to allow access to, and enable repair and/or modification of, the structure.

Figure 2:
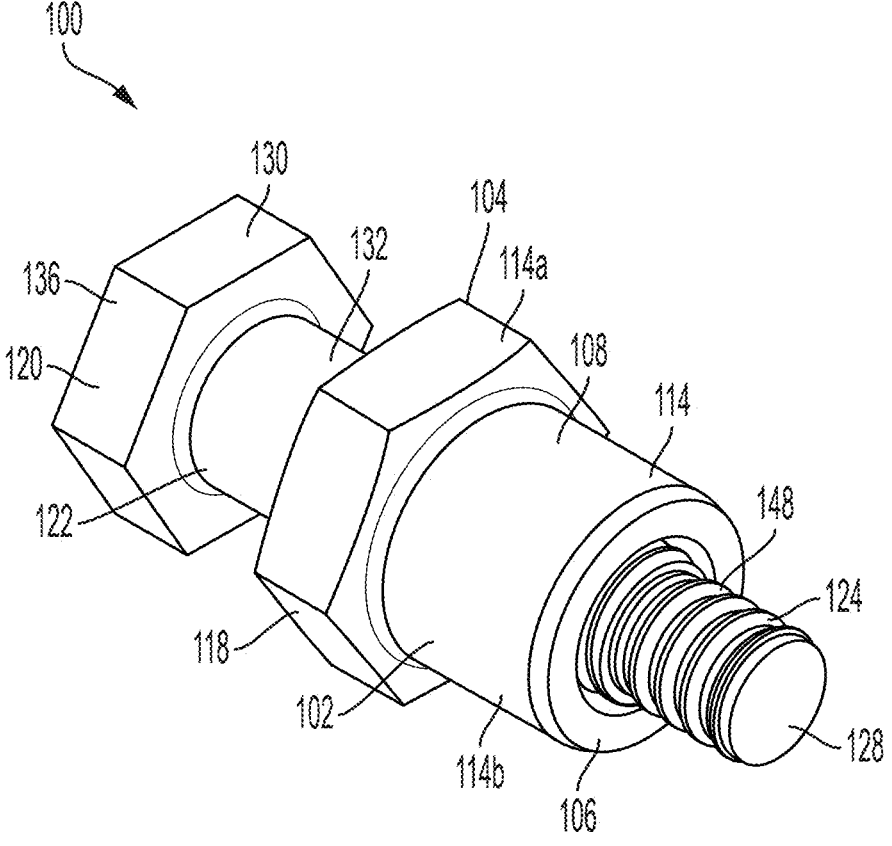
FIG. 2 is a perspective view showing aspects of a non-limiting embodiment of a multi-piece fastener according to the present disclosure.

FIGS. 1A and 2 illustrate a non-limiting embodiment of a multi-piece fastener 100 according to the present disclosure. The multi-piece fastener 100 can be configured to be installed in a bore in a structure (for example, as shown and described with respect to FIGS. 3-5). The multi-piece fastener 100 can include at least two components, for example a fastening collar 102 and a pin 120, as illustrated in FIG. 1A. In other non-limiting embodiments (not shown), a multi-piece fastener according to the present disclosure can comprise three or more components. In various non-limiting embodiments, the multi-piece fastener 100 can consist of a two-piece assembly including, for example, the fastening collar 102 and the pin 120. In certain non-limiting embodiments, the multi-piece fastener 100 can comprise a lockbolt. In certain non-limiting embodiments including a lockbolt, the lockbolt can be a structural lockbolt fastener, such as, for example, a structural rivet, a structural bolt, or a structural stud.

Again referring to FIG. 1A, the fastening collar 102 of the multi-piece fastener 100 can comprise a first collar end 104, a second collar end 106, an elongate portion 108 intermediate the first collar end 104 and the second collar end 106, an external collar surface 114, and an inner collar surface 116. The elongate portion 108 can define a longitudinal axis, $A_1$, of the fastening collar 102 and/or the multi-piece fastener 100. The inner collar surface 116 extends from the first collar end 104 to the second collar end 106. The inner collar surface can define a collar cavity 110 that extends through the elongate portion 108, from the first collar end 104 to the second collar end 106.

The external collar surface 114 is configured to receive a torque such that the fastening collar 102 can be rotated about the longitudinal axis, $A_1$, by forcibly contacting the external collar surface 114 and rotating the fastening collar 102. For example, the external collar surface 114 can comprise a first surface region 114a comprising at least one of a substantially flat side, a rib, a spline, an indent, a knurl, a lobe, a bore, a tab, or a similar structural feature. For example, the in various non-limiting embodiments, first surface region 114a can be selected from square nut portion, a hex nut portion, a knurled nut portion, and a splined nut portion.

In various non-limiting embodiments, the external collar surface 114 further comprises a second surface region 114*b* adjacent to the first surface region 114*a*, and the second surface region 114*b* can comprise a substantially cylindrical shape or an alternative shape suitable to be deformed by an anvil of a multi-piece fastener installation tool. In certain non-limiting embodiments, the external collar surface 114 consists of the first surface region 114*a* and the second surface region 114*b*. In various non-limiting embodiments, the external collar surface 114 comprises a third surface region (not shown).

Again referring to FIG. 1A, in various non-limiting embodiments the pin 120 of the multi-piece fastener 100 can comprise a first pin end 128, a second pin end 130, and a shank 122. The shank 122 can comprise a shape suitable to be received within the collar cavity 110 of the fastening collar 102. In various non-limiting embodiments, the shank 122 has a generally cylindrical shape. The shank 122 can be intermediate the first pin end 128 and the second pin end 130 and can be dimensioned so that it can be inserted into and extend at least partially through the collar cavity 110. When the shank 122 is inserted in the cavity 110, the first pin end 128 can be disposed adjacent to the second collar end 106, and the second pin end 130 can be disposed adjacent to the first collar end 104.

In various non-limiting embodiments, the second pin end 130 can further comprise a head portion 136 configured to inhibit the pin 120 from traversing through a bore in a structure (as described with respect to FIG. 3-5 herein) beyond a predetermined distance. The head portion 130 can be configured to receive a torque such that the pin 120 can be rotated about the longitudinal axis, $A_1$, by forcibly contacting the head portion 136 and rotating the pin 120. For example, the head portion 136 can comprise at least one of a substantially flat side, a rib, a spline, an indent, a knurl, a lobe, a bore, a recessed socket, a tab, and a similar structural feature. For example, the head portion 136 can comprise one of a square head portion, a hex head portion, a knurled head portion, a splined head portion, and a recessed socket head portion.

The shank 122 comprises a tapered threaded portion 126 and, in various non-limiting embodiments, optionally further comprises a pull region 124 and/or a first region 132, as further discussed below. The tapered threaded portion 126 can be intermediate the pull region 124 and the second pin end 130. In various non-limiting embodiments, the tapered threaded portion 126 can be intermediate the first shank region 132 and the pull region 124. In certain non-limiting embodiments, the first shank region 132 can comprise a substantially cylindrical shape.

The tapered threaded portion 126 comprises threads 138. The threads 138 can be right handed threads or left handed threads. The threads 138 can be, for example, square threads, trapezoidal threads, buttress threads, another thread type, or a combination of thread types.

Figure 1B:
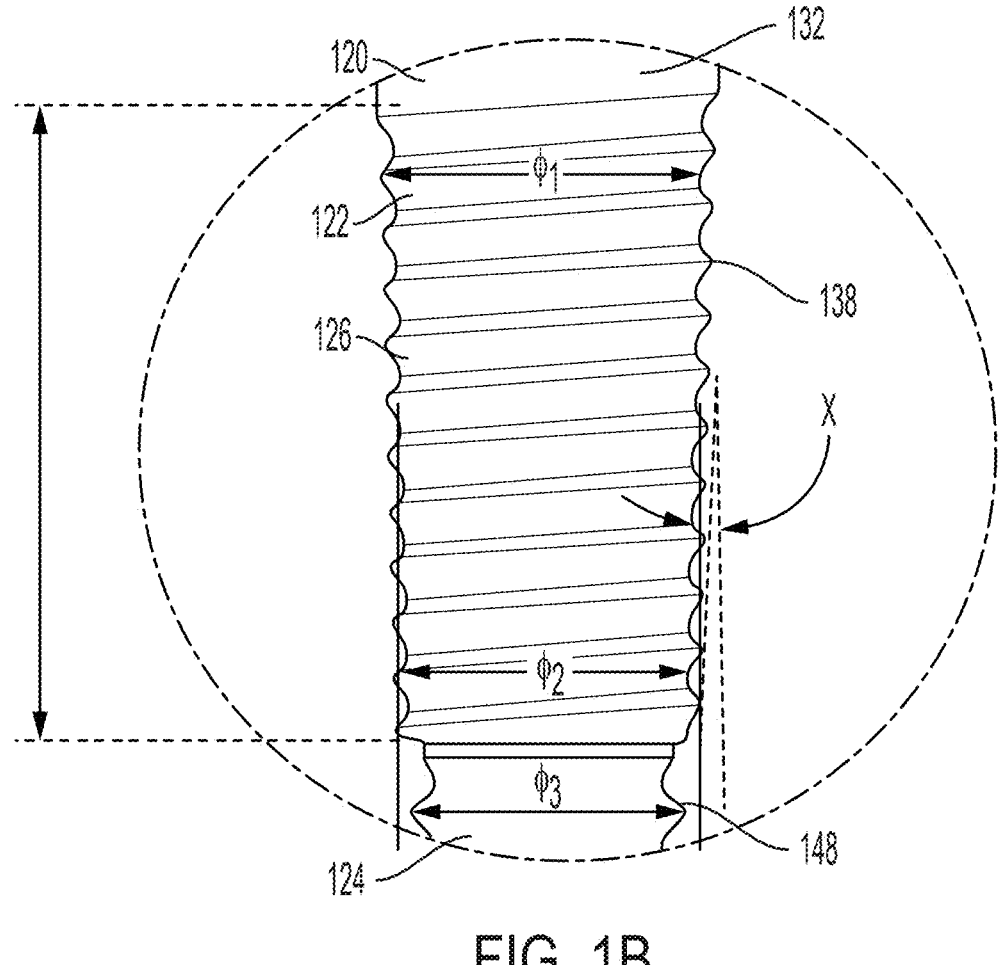
FIG. 1B is a detailed view of area 1B in FIG. 1A.

The threads 138 are formed on the shank 122 in a helical path about the longitudinal axis, $A_1$. The helical path can have a conical shape such that the radius of the helix transverse to the longitudinal axis, $A_1$, varies along an axial length of the shank 122. In this way, the fastening collar 102 can be retained on the pin 120 after deformation of the fastening collar 102 on the pin 120 due to contact of the inner collar surface 116 with the threads 138. The contact between the inner collar surface 116 and the threads 138 can be reduced as the fastening collar 102 is removed from the pin 120 by rotation. The tapered threaded portion 126 can comprise a taper that extends along the longitudinal axis, $A1$, such that a dimension of the tapered threaded portion 126 gradually or incrementally decreases along the tapered threaded portion 126 in an axial direction towards the first pin end 128. For example, referring to FIG. 1B, the tapered threaded portion 126 can define a taper angle, X, no greater than 15 degrees relative to the longitudinal axis, $A_1$, such as, for example, no greater than 10 degrees, no greater than 9 degrees, no greater than 8 degrees, no greater than 7 degrees, or no greater than 6 degrees. In various non-limiting embodiments, the tapered threaded portion 126 can define a taper angle, X, of at least 0.005 degrees relative to the longitudinal axis, $A_1$, such as, for example, at least 0.1 degree, at least 0.5 degree, at least 1 degree, at least 2 degrees, at least 5 degrees, at least 6 degrees, or at least 7 degrees. In certain non-limiting embodiments, the tapered threaded portion 126 can define a taper angle, X, in a range of 0.005 degree to 15 degrees relative to the longitudinal axis, $A_1$, such as for example, in a range of 0.1 degree to 15 degrees relative to the longitudinal axis, A1, in a range of 0.5 degrees to 15 degrees relative to the longitudinal axis, A1, in a range of 5 degrees to 10 degrees relative to the longitudinal axis, $A_1$, or in a range of 5 degrees to 7 degrees relative to the longitudinal axis, A1. In various non-limiting embodiments, a thread crest of the threads 138 of the tapered threaded portion 126 decreases along the tapered threaded portion 126 in an axial direction towards the first pin end 128. In certain non-limiting embodiments, a diameter, $\varphi_2$, of the shank 122 in the tapered threaded portion 126 proximal to the first pin end 128 is less than a diameter, $\varphi_1$, of the shank 122 in the tapered threaded portion 126 proximal to the second pin end 130. In various non-limiting embodiments, a diameter, $\varphi_3$, of the shank 122 in the pull region 124 is less than the diameter, $\varphi_2$, of the shank 122. In certain non-limiting embodiments, the diameter, $\varphi_1$, of the shank 122 is in a range of 0.06 inches to 4 inches. In various non-limiting embodiments, the diameter, $\varphi_1$, of the shank 122 is a conventional outside diameter of a conventional lock bolt.

In certain non-limiting embodiments, the dimension of the tapered threaded portion 126 gradually or incrementally decreases along at least 50% of the length, l, of the tapered threaded portion 126 in the axial direction towards the first pin end 128, such as for example, at least 60% of the length, l, at least 70% of the length, l, at least 80% of the length, l, or at least 90% of the length, l.

Referring again to FIG. 1A, in various non-limiting embodiments of a multi-piece fastener according to the present disclosure, the first pin end 128 can comprise a pull region 124, which is configured to be engaged by a multi-piece fastener installation tool (not shown) when installing the multi-piece fastener 100 in a bore in a structure. The pull region 124 can comprise an axial length, and in various non-limiting embodiments the pull region 124 can comprise a taper. In various non-limiting embodiments, the pull region 124 can comprise at least one of a generally smooth region, an annular shoulder, a groove, and a bore, and/or can comprise one or more other features configured to be engaged by a multi-piece fastener installation tool. For example, and without limitation, the pull region 124 can comprise grooves 148, as illustrated in FIGS. 1A-1B and 2-5, that can be engaged by a multi-piece fastener installation tool. In certain non-limiting embodiments, the multi-piece fastener installation tool can be a puller tool or a squeezer tool.

Referring again to FIG. 1A, the shank 122 of the pin 120 can define the longitudinal axis, $A_1$, of the pin 120 and/or the multi-piece fastener 100. The shank 122 can be configured to engage the fastening collar 102 in order to retain the shank 122 to the fastening collar 102. Upon engagement between the shank 122 and the fastening collar 102, the longitudinal axis of the pin 120 and the longitudinal axis of the fastening collar 102 can be substantially aligned along a longitudinal axis, $A_1$, of the multi-piece fastener 100.

The collar cavity 110 of the fastening collar 102 can be configured to at least partially receive the shank 122 of the pin 120 therein. For example, the collar cavity 110 can comprise a shape suitable to receive the shank 122 of the pin 120. The fastening collar 102, including the inner collar surface 116, can be configured to be at least partially deformed onto the shank 122, including the tapered threaded portion 126. For example, during and/or after introduction of the shank 122 into the collar cavity 110, the elongate portion 108, including at least a portion of the inner collar surface 116, can be at least partially deformed (e.g., swaged) onto the tapered threaded portion 126 responsive to forcible contact between the fastening collar 102 and a multi-piece fastener installation tool. Deformation of the elongate portion 108 can secure the fastening collar 102 to the shank 122 of the pin 120, securing the multi-piece fastener within a bore of a structure. The fastening collar 102 can be removed from the shank 122 after deformation by applying a torque to the external collar surface 118, thereby rotating the fastening collar 102 about the longitudinal axis, $A_1$, such that the fastening collar 102 backs off of threads 138.

In various non-limiting embodiments, the pin 120 may comprise a breakneck groove (not shown) configured to fracture to separate all or a portion of the pull region 124 from the pin 120 upon installation of the multi-piece fastener 100 in a structure. In certain other non-limiting embodiments, the pin 120 does not comprise a breakneck groove but is configured to include one or more other features so that the pull region 124 of the pin 120 fractures during installation of the multi-piece fastener 100. In various non-limiting embodiments of the multi-piece fastener 100, the pin 120 does not comprise a breakneck groove or other feature configured to fracture upon installation of the multi-piece fastener 100, and the pull region 124 remains intact after installation. Thus, according to various non-limiting embodiments, multi-piece fasteners according to the present disclosure may be installed in a structure without fracturing of a breakneck groove or other feature, or the fasteners may include a breakneck groove or other feature that fractures upon installation of the fastener into the structure.

The multi-piece fastener 100 can comprise at least one of a metal, a metal alloy, a composite material, or another suitable material. For example, in various non-limiting embodiments, the multi-piece fastener 100 can comprise at least one of aluminum, an aluminum alloy, titanium, a titanium alloy, nickel, a nickel alloy, iron, an iron alloy, and a carbon fiber composite material.

Figure 3:
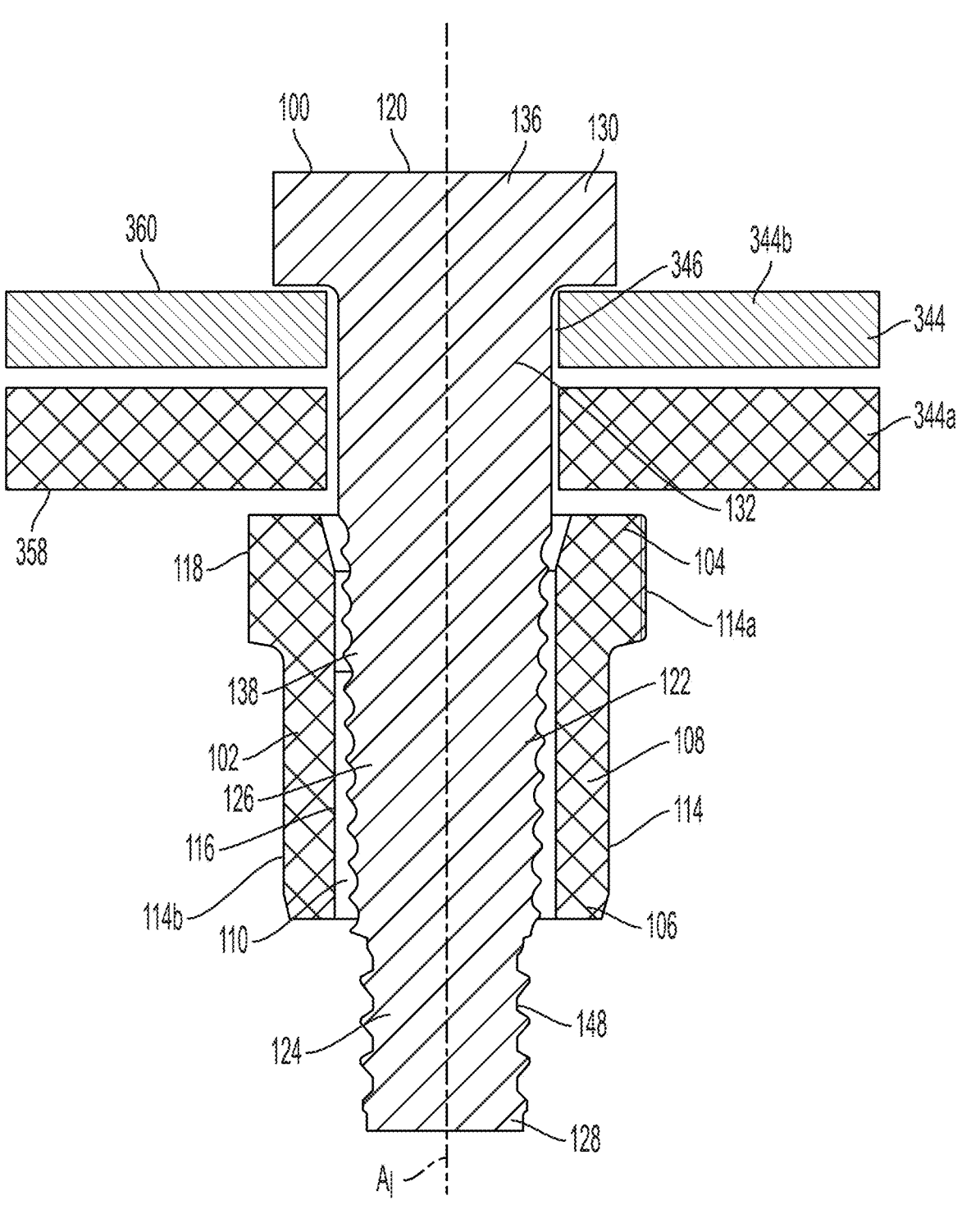
FIG. 3 is a partial cross-sectional side elevational view showing aspects of a non-limiting embodiment of a multi-piece fastener according to the present disclosure, shown in a second position, prior to deformation of the fastening collar onto the pin.
Figure 4:
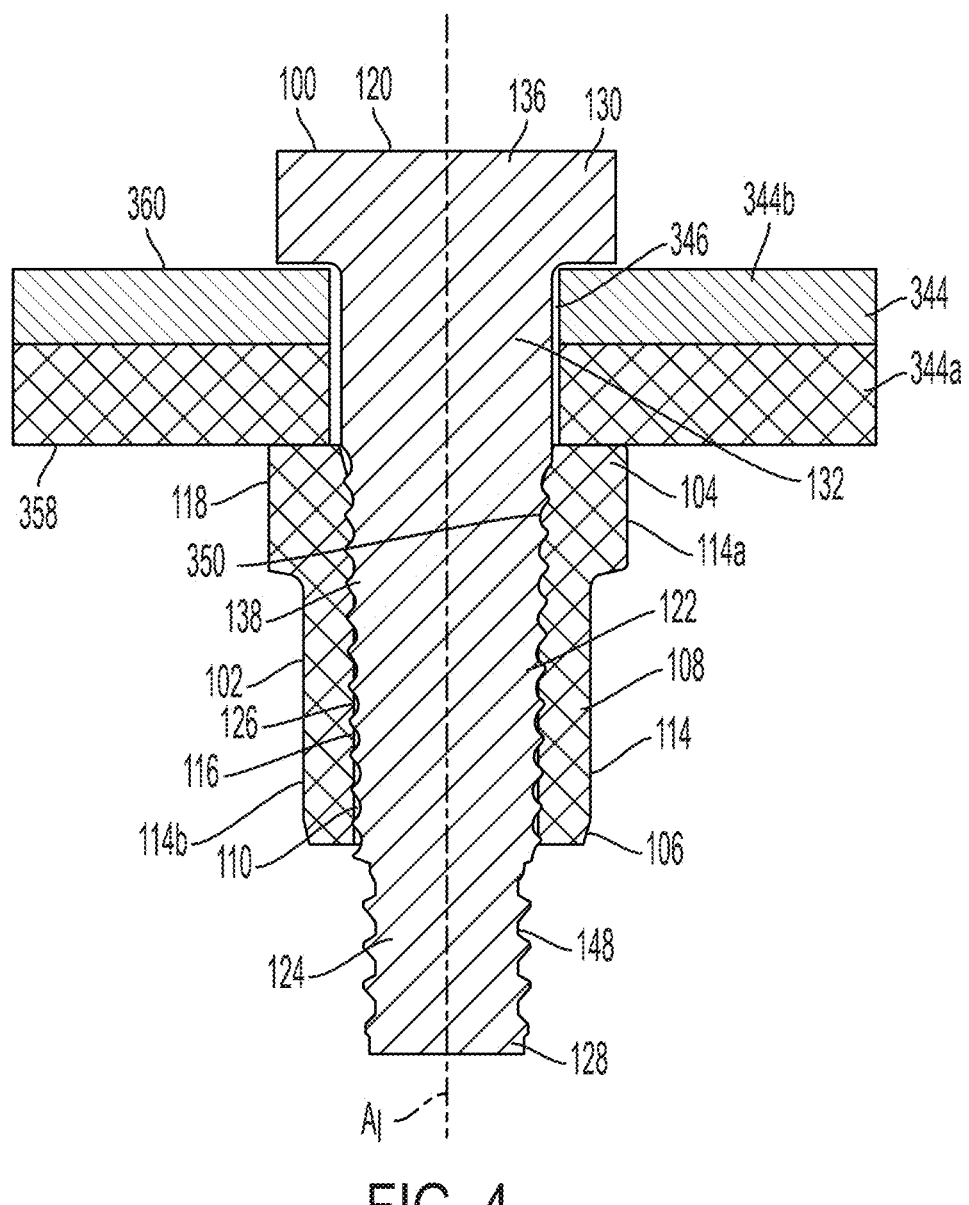
FIG. 4 is a partial cross-sectional side elevational view of the multi-piece fastener of FIG. 3, shown after deformation of the fastening collar onto the pin.
Figure 5:
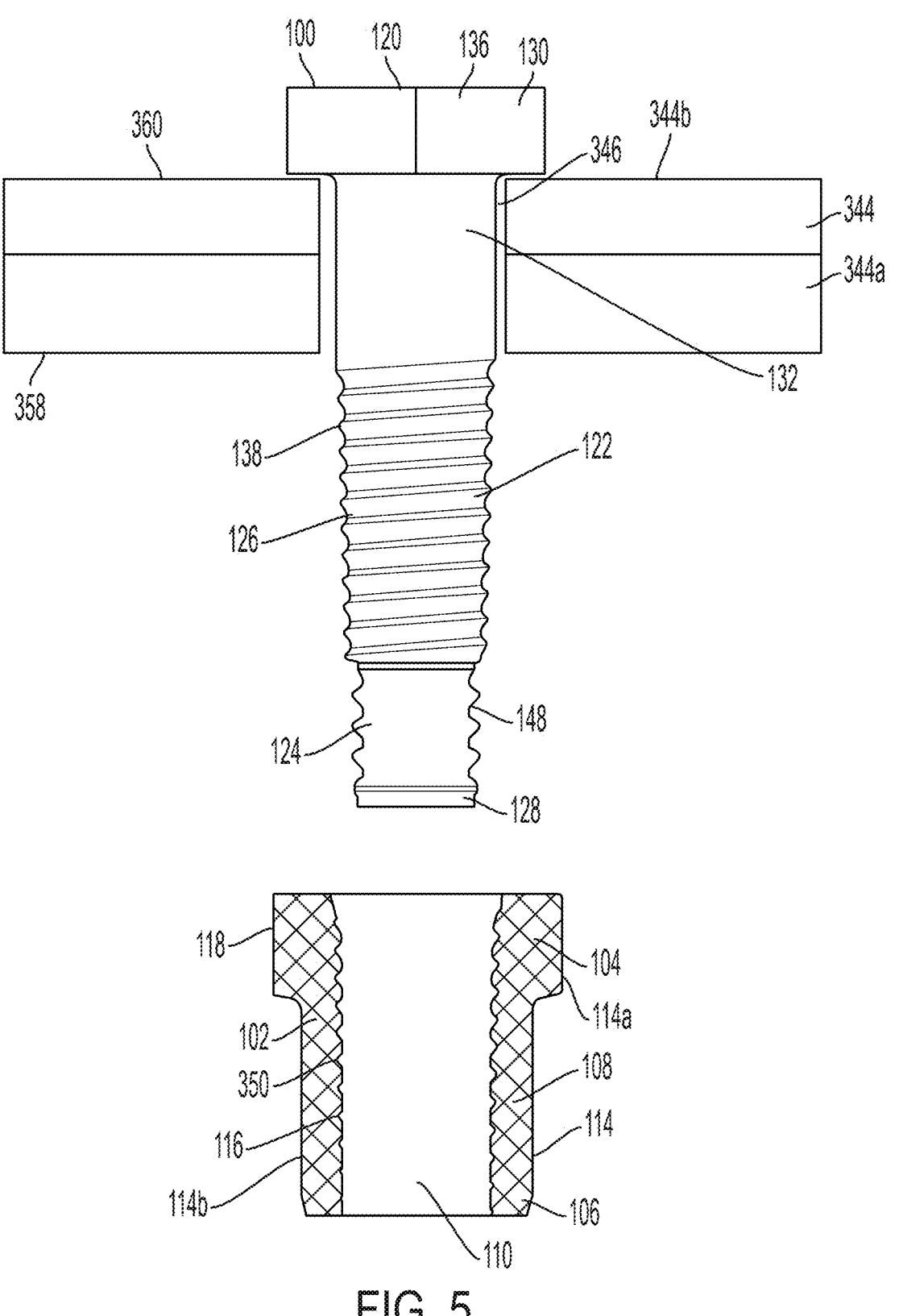
FIG. 5 is a partial cross-sectional side elevational view of the multi-piece fastener of FIG. 4, shown after removal of the deformed fastening collar from the pin.

As illustrated in the non-limiting embodiments shown in FIGS. 3-5, the multi-piece fastener 100 can be installed into a bore 346 of a structure 344. As illustrated, the bore 346 can extend through the structure 344 from a first side 358 to a second side 360. The structure 344 can comprise, for example, at least one of a metal, a metal alloy, a composite material, or another suitable material. For example, in certain non-limiting embodiments, the structure 344 can comprise one or more of aluminum, an aluminum alloy, titanium, a titanium alloy, nickel, a nickel alloy, iron, an iron alloy, and a carbon fiber composite material. In various non-limiting embodiments, the structure 344 in which the multi-piece fastener 100 is installed comprises aluminum and/or an aluminum alloy, such as, for example, 7075 aluminum alloy.

In various embodiments the structure into which a fastener according to the present disclosure can be installed can be configured as at least one of an aerospace component or structure, an automotive component or structure, a transportation component or structure, a building and construction component or structure, or another component or structure.

The structure 344 can comprise a single layer of material or two or more layers of material. For example, as illustrated in FIGS. 3-5, the structure 344 can comprise a first layer 344a and a second layer 344b, which may be the same material or different materials. The first layer 344a can be positioned intermediate the second layer 344b and the fastening collar 102 when the multi-piece fastener 100 is installed. In various non-limiting embodiments, the first layer 344a is adjacent to or contacts the fastening collar 102.

Additionally, in various non-limiting embodiments, the first pin end 128 can be sized and configured to facilitate alignment of the pin 120 with the bore 346, thereby allowing the first pin end 128 to readily move into and through the bore 346. In various non-limiting embodiments, the head portion 136 can be sized and configured to inhibit the pin 120 from traversing into the bore 346 beyond a predetermined distance.

As illustrated in FIG. 3, the first pin end 128 of the pin 120 was positioned in alignment with the second side 360 of the bore 346 and inserted through the bore 346. The fastening collar 102 was positioned over the first pin end 128, and the first pin end 128 has been inserted into the collar cavity 110 of the fastening collar 102. In the arrangement shown in FIG. 3 the fastening collar 102 has not yet been deformed about the pin 120.

With reference to FIGS. 3 and 4, and as will be understood by those having ordinary skill in the multi-piece fastener art, the jaws of the collet of a multi-piece fastener installation tool (e.g., a fastening collar installation tool) can close around and forcibly engage the pull region 124 of pin 120. Upon engagement, the collet can apply an axial force to the pull region 124 of the pin 120. The collet can retract into a housing of the multi-piece fastener installation tool, and the pin 120 also moves as the collet retracts due to the engagement between the pull region 124 and the collet. As the pin 120 moves in this way, an anvil of the installation tool can forcibly contact the fastening collar 102 with an axial force and urge the fastening collar 102 along the pin 120 in a direction away from the first pin end 128. The movement of the fastening collar 102 can decrease a gap, if present, between the first layer 344a and the second layer 344b of the structure 344 and forcibly contact the fastening collar 102 with the structure 344.

When the anvil of the multi-piece fastener installation tool imparts a sufficient force to the fastening collar 102, the elongate portion 108 can be at least partially deformed onto the pin 120. For example, the inner collar surface 116 can be deformed onto the tapered threaded portion 126 of the shank 122 of the pin 120 intermediate the first layer 344a and the first pin end 128. The deformation of the inner collar surface 116 onto the tapered threaded portion 126 can form threads 350 in the inner collar surface 116 of the fastening collar 102. Since the threads 350 are formed on the inner collar surface 116 during the installation process by contact with the threads 138 of the tapered threaded portion 126, the threads 350 and the threads 138 can be substantially aligned such that they are not cross-threaded. In various non-limiting embodiments, since the fastening collar 102 is deformed onto the pin 120, the multi-piece fastener 100 is vibration resistant, similar to a conventional lock bolt.

The deformation of the elongate portion 108 can secure the fastening collar 102 to the pin 120 and thereby secure the multi-piece fastener 100 to at least a portion of the structure 344. In that way, for example, the first layer 344a and second layer 344b of the structure 344 are secured together. After installation of the multi-piece fastener 100 into the structure 344, the fastening collar 102 and the head portion 136 of the pin 120 are applying a clamping force to the structure 344. In the arrangement shown in FIG. 4, the fastening collar 102 was deformed onto tapered threaded portion 126 and threads 350 formed as a result of the deformation, thereby the fastening collar 102 is secured to the pin 120. The gap between the first layer 344a and the second layer 344b of the structure 344 in FIG. 3 has been decreased as shown in FIG. 4.

As illustrated in FIG. 4, the pin 120 may not fracture after installation into the structure 344. Alternatively, the pin 120 may fracture (not shown) after installation into the structure 344 as a result of force applied to the pin 120 by the multi-piece fastener installation tool. For example, the pin 120 may fracture along a breakneck groove, if present, after installation into the structure 344.

The configuration of certain embodiments of a multi-piece fastener according to the present disclosure allows the fastener to be disassembled and removed from the structure to provide access to the structure. For example, with reference to the multi-piece fastener 100 shown in FIGS. 3-5, subsequent to installation of multi-piece fastener 100 in structure 344, a torque can be applied to the external collar surface 114 of the fastening collar 102 to rotate the fastening collar 102 about the longitudinal axis, $A_1$. By rotating the fastening collar 102 in a suitable rotational direction, the fastening collar 102 is urged to move along the tapered threaded portion 126 of the pin 120 in an axial direction away from the second pin end 130. This movement of the fastening collar 102 along the pin 120 reduces the interference of the threads 350 on the inner collar surface 116 with the threads 138 of the tapered threaded portion 126 of the pin 120 because of the relative disengagement of the matched tapers between threads 350 and 138. When interference between the threads 350 of the fastening collar 102 and the threads 138 of the pin 120 is reduced to a suitable degree, the fastening collar 102 can be further rotated about the pin 120 in a fashion similar to a conventional nut, and removed from the pin 120, as shown in FIG. 5. The clamping force applied to the structure 344 by the multi-piece fastener 100 can be relieved by the removal of the fastening collar 102, and the pin 120 can thereafter be removed from the bore 346 in the structure 344.

Embodiments of multi-piece fasteners according to the present disclosure can be used in a method for fastening a structure. FIG. 6 illustrates steps of a non-limiting embodiment of such a method. The method illustrated in FIG. 6 can comprise inserting the first pin end 128 of a multi-piece fastener 100 according to the present disclosure into a bore 346 in a structure 344 (at step 602). After inserting the first pin end 128 into the structure 344, the first pin end 128 can be inserted into the collar cavity 110 of the fastening collar 102 (at step 604). Subsequent to inserting the first pin end 128 into the collar cavity 110, in certain non-limiting embodiments, the fastening collar 102 can be forcibly contacted with an anvil of a multi-piece fastener installation apparatus, urging the fastening collar 102 to move along the pin 120 in a direction away from the first pin end 128 (at step 606). In various non-limiting embodiments, the pull region 124 of the pin 120 can be forcibly contacted with jaws of the collet of the multi-piece fastener installation apparatus (at step 608). In various non-limiting embodiments, steps 606 and 608 can occur simultaneously. The inner collar surface 116 of the fastening collar 102 can be deformed onto the tapered threaded portion 126 of the shank 122 of the pin 120, thereby securing the pin 120 to the fastening collar 102 and retaining at least a portion of the multi-piece fastener 100 in the structure 344 (at step 610). Subsequent to deforming the inner collar surface 114, the fastening collar 102 can be removed from the pin 120 by applying a torque to the external collar surface 116 (at step 612).

Various aspects of embodiments of inventions according to the present disclosure include, but are not limited to, the aspects listed in the following numbered clauses.

1. A multi-piece fastener comprising:
   a fastening collar comprising
      a first collar end,
      a second collar end,
      an inner collar surface extending from the first collar end to the second collar end and defining a collar cavity, and
      an external collar surface configured to receive a torque; and
   a pin configured to be at least partially received by the collar cavity, the pin comprising
      a first pin end,
      a second pin end, and
      a shank extending intermediate the first pin end and the second pin end, wherein the shank comprises a tapered threaded portion, and wherein the inner collar surface is configured to be deformed onto the tapered threaded portion and secured to the shank, and the fastening collar is configured to be removed from the shank after deformation by applying a torque to the external collar surface.

2. The multi-piece fastener of clause 1, wherein the second pin end comprises a head portion configured to receive a torque.

3. The multi-piece fastener of clause 2, wherein the head portion comprises at least one of a substantially flat side, a rib, a spline, an indent, a knurl, a lobe, a bore, a recessed socket, and a tab.

4. The multi-piece fastener of any of clauses 1-3, wherein a dimension of the tapered threaded portion decreases along a helical lock groove thread portion in an axial direction towards the first pin end.

5. The multi-piece fastener of clause 4, wherein the dimension is a thread crest of the tapered threaded portion.

6. The multi-piece fastener of any of clauses 4-5, wherein the dimension decreases along at least 50% of the length of the tapered threaded portion in the axial direction towards the first pin end.

7. The multi-piece fastener of any of clauses 4-6, wherein the tapered threaded portion decreases in diameter towards the first pin end at an angle in a range of 0.005 degrees to 15 degrees.

8. The multi-piece fastener of any of clauses 1-7, wherein the shank of the pin comprises a pull region, wherein the tapered threaded portion is intermediate the pull region and the second pin end.

9. The multi-piece fastener of clause 8, wherein the shank of the pin comprises a first region, wherein the tapered threaded portion is intermediate the first shank region and the pull region, and wherein the first shank region comprises a substantially cylindrical shape.

10. The multi-piece fastener of any of clauses 1-9, wherein the external collar surface comprises a first surface region comprising at least one of a substantially flat side, a rib, a spline, an indent, a knurl, a lobe, a bore, and a tab.

11. The multi-piece fastener of clause 10, wherein the external collar surface comprises a second surface region adjacent to the first surface region and the second surface region comprises a substantially cylindrical shape.

12. The multi-piece fastener of any of clauses 1-11, wherein the multi-piece fastener is configured to be installed in a bore in a structure and wherein the structure is configured as at least one of an aerospace part or component, an automotive part or component, a transportation part or component, and a building and construction part or component.

13. The multi-piece fastener of clause 1, wherein a diameter of the shank is in a range of 0.06 inches to 4 inches.

14. A lockbolt comprising the multi-piece fastener of any one of clauses 1-13.

15. A method for fastening, the method comprising:
inserting the first pin end of the multi-piece fastener of any one of clauses 1-13 or the lockbolt of clause 14 into a bore in a structure; and
deforming the inner collar surface onto the tapered threaded portion thereby securing the pin to the fastening collar.

16. A method for fastening, the method comprising:
inserting a first pin end of a multi-piece fastener into a bore in a structure, the multi-piece fastener comprising
a fastening collar comprising
a first collar end,
a second collar end,
an inner collar surface extending from the first collar end to the second collar end and defining a collar cavity, and
an external collar surface, and
a pin configured to be at least partially received by the collar cavity, the pin comprising
a first pin end,
a second pin end, and
a shank extending intermediate the first pin end and the second pin end,
wherein the shank comprises a tapered threaded portion;
deforming the inner collar surface onto the tapered threaded portion thereby securing the pin to the fastening collar.

17. The method of clause 16, further comprising:
subsequent to deforming the inner collar surface, removing the fastening collar from the pin by applying a torque to the external collar surface.

18. The method of any of clauses 16-17, wherein the first pin end comprises a pull region and the method further comprises:
forcibly contacting the pull region with jaws of a collet of a fastening collar installation apparatus; and
forcibly contacting the fastening collar with an anvil of the fastening collar installation apparatus thereby deforming the inner collar surface onto the tapered threaded portion.

19. The method of any of clauses 16-18, wherein a dimension of the tapered threaded portion decreases along the tapered threaded portion in an axial direction towards the first pin end.

20. The method of any of clauses 16-19, wherein the dimension is a thread crest of the tapered threaded portion.

21. The method of any of clauses 16-20, wherein the dimension decreases along at least 50% of the length of the tapered threaded portion in the axial direction towards the first pin end 22. The method of any of clauses 16-21, wherein the tapered lock groove thread portion decreases in diameter towards the first pin end at an angle in a range of 0.005 degrees to 15 degrees.

23. A structure configured as at least one of an aerospace part or component, an automotive part or component, a transportation part or component, and a building and construction part or component, wherein the structure comprises the multi-piece fastener of any of clauses 1-13 and/or the lockbolt of cause 14.

One skilled in the art will recognize that the herein described fasteners, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:
1. A lockbolt fastener comprising:
a fastening collar comprising
a first collar end,
a second collar end,
an inner collar surface extending from the first collar end to the second collar end and defining a collar cavity, and
an external collar surface comprising a first surface region configured to receive a torque and a second surface region adjacent to the first surface region, wherein the second surface region comprises a substantially cylindrical shape; and
a pin configured to be at least partially received by the collar cavity, the pin comprising
a first pin end,
a second pin end comprising a head portion, and
a shank extending intermediate the first pin end and the second pin end, wherein the shank comprises
a pull region, and
a tapered threaded portion intermediate the pull region and the second pin end, wherein a diameter of the tapered threaded portion decreases in a direction towards the first pin end, and wherein the inner collar surface is configured to be deformed onto the tapered threaded portion and secured to the shank, and wherein the tapered threaded portion includes a continuous thread such that the fastening collar is configured to be removed from the shank after deformation by applying a torque to the first surface region of the external collar surface.

2. The lockbolt fastener of claim 1, wherein the head portion is configured to receive a torque.

3. The lockbolt fastener of claim 2, wherein the head portion comprises at least one of a substantially flat side, a rib, a spline, an indent, a knurl, a lobe, a bore, a recessed socket, and a tab.

4. The lockbolt fastener of claim 1, wherein a dimension of the tapered threaded portion decreases along a helical lock groove thread portion in an axial direction towards the first pin end.

5. The lockbolt fastener of claim 4, wherein the dimension is a thread crest of the tapered threaded portion.

6. The lockbolt fastener of claim 4, wherein the dimension decreases along at least 50% of a length of the tapered threaded portion in the axial direction towards the first pin end.

7. The lockbolt fastener of claim 4, wherein the tapered threaded portion decreases in diameter towards the first pin end at an angle in a range of 0.005 degrees to 15 degrees.

8. The lockbolt fastener of claim 4, wherein the tapered threaded portion decreases in diameter towards the first pin end at an angle in a range of 0.5 degrees to 15 degrees.

9. The lockbolt fastener of claim 4, wherein the tapered threaded portion decreases in diameter towards the first pin end at an angle in a range of 5 degrees to 10 degrees.

10. The lockbolt fastener of claim 1, wherein the shank of the pin comprises a first shank region, wherein the tapered threaded portion is intermediate the first shank region and the pull region, and wherein the first shank region comprises a substantially cylindrical shape.

11. The lockbolt fastener of claim 1, wherein the first surface region of the external collar surface comprises at least one of a substantially flat side, a rib, a spline, an indent, a knurl, a lobe, a bore, and a tab.

12. The lockbolt fastener of claim 1, wherein the multi piece lockbolt fastener is configured to be installed in a bore in a structure and wherein the structure is configured as at least one of an aerospace part or component, an automotive part or component, a transportation part or component, and a building and construction part or component.

13. The lockbolt fastener of claim 1, wherein a diameter of the shank is in a range of 0.06 inches to 4 inches.

14. The lockbolt fastener of claim 1, wherein the pull region comprises an annular shoulder, a groove, or a combination thereof.

15. The lockbolt fastener of claim 1, wherein the first surface region comprises a square nut portion, a hex nut portion, a knurled nut portion, or a splined nut portion.

16. The lockbolt fastener of claim 1, wherein the shank does not include a breakneck groove.

17. A method for fastening, the method comprising:

inserting the first pin end of the lockbolt fastener of claim 1 into a bore in a structure, applying an axial force to the pull region of the pin;

imparting a force to the second surface region to swage the inner collar surface onto the tapered threaded portion thereby securing the pin to the fastening collar and forming threads on the inner collar surface.

18. A method for fastening, the method comprising:

inserting a first pin end of a multi-piece fastener into a bore in a structure, the multi-piece fastener comprising a fastening collar comprising a first collar end, a second collar end, an inner collar surface extending from the first collar end to the second collar end and defining a collar cavity, and an external collar surface comprising a first surface region and a second surface region adjacent to the first surface region, wherein the second surface region comprises a substantially cylindrical shape, and a pin configured to be at least partially received by the collar cavity, the pin comprising the first pin end, a second pin end comprising a head portion, and a shank extending intermediate the first pin end and the second pin end, wherein the shank comprises a pull region, and a tapered threaded portion intermediate the pull region and the second pin end, wherein a diameter of the tapered threaded portion decreases in a direction towards the first pin end, wherein the tapered portion includes a continuous thread;

deforming the inner collar surface onto the tapered threaded portion thereby securing the pin to the fastening collar, and subsequent to deforming the inner collar surface, removing the fastening collar from the pin by applying a torque to the external collar surface.

19. The method of claim 18, wherein a dimension decreases along at least 50% of a length of the tapered threaded portion in an axial direction towards the first pin end.

20. The method of claim 18, wherein the tapered threaded portion decreases in diameter towards the first pin end at an angle in a range of 0.005 degrees to 15 degrees.

\* \* \* \* \*